(12) United States Patent
Shukla et al.

(10) Patent No.: US 10,284,468 B1
(45) Date of Patent: May 7, 2019

(54) E-CHANNEL IDENTIFIERS (ECIDS) FOR SCALABLE SATELLITE DEVICE CLUSTERING CONTROL IN A CAMPUS NETWORK

(71) Applicant: Juniper Networks, Inc., Sunnyvale, CA (US)

(72) Inventors: Amit Shukla, Sunnyvale, CA (US); Xiangwen Xu, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 196 days.

(21) Appl. No.: 15/293,089

(22) Filed: Oct. 13, 2016

(51) Int. Cl.
| | | |
|---|---|---|
| *H04L 12/741* | (2013.01) | |
| *H04L 29/06* | (2006.01) | |
| *H04L 12/801* | (2013.01) | |
| *H04L 12/701* | (2013.01) | |

(52) U.S. Cl.
CPC .............. *H04L 45/74* (2013.01); *H04L 47/17* (2013.01); *H04L 69/22* (2013.01); *H04L 45/00* (2013.01)

(58) Field of Classification Search
CPC ......... H04L 63/22; H04L 47/10; H04L 47/17; H04L 45/02; H04L 45/74; H04L 69/22; H04L 69/00; H04L 45/00
USPC ......................................................... 370/392
See application file for complete search history.

(56) References Cited

U.S. PATENT DOCUMENTS

| | | | |
|---|---|---|---|
| 6,633,745 B1 | 10/2003 | Bethscheider | |
| 7,738,837 B2 | 6/2010 | Karabinis | |
| 2002/0147011 A1 | 10/2002 | Kay | |
| 2012/0163374 A1* | 6/2012 | Shah | H04L 12/413 370/357 |
| 2013/0176900 A1 | 7/2013 | Jogadhenu | |
| 2014/0177641 A1* | 6/2014 | Kalkunte | H04L 45/00 370/401 |
| 2015/0281076 A1* | 10/2015 | Zhang | H04L 45/64 370/392 |
| 2016/0105379 A1* | 4/2016 | Murthy | H04L 49/3009 370/392 |
| 2016/0359641 A1* | 12/2016 | Bhat | H04L 12/4666 |
| 2016/0380924 A1* | 12/2016 | Sivasankar | H04L 49/208 370/419 |

(Continued)

OTHER PUBLICATIONS

Juniper Networks, "Understanding Satellite Device Clustering in a Junos Fusion," https://www.juniper.net/techpubs/en_US/junos16.1/topics/concept/fusion-satellite-device-clustering-understanding.html, Aug. 24, 2016, 3 pages.

(Continued)

*Primary Examiner* — Rownak Islam
(74) *Attorney, Agent, or Firm* — Harrity & Harrity, LLP

(57) ABSTRACT

A device may receive network traffic for transmission in a campus network. The campus network may include a set of aggregation devices and a set of satellite devices. The set of satellite devices may be grouped into a set of satellite clusters of the campus network. The device may generate a packet header for the network traffic. The packet header may include an E-channel identifier (ECID) with a quantity of N bits (N>10) reserved to address a packet to a particular satellite device of the set of satellite devices and to a particular port of a set of ports of the particular satellite device. The device may transmit the network traffic using the packet header based on generating the packet header.

20 Claims, 6 Drawing Sheets

500 →

| | | | |
|---|---|---|---|
| 505 — 1st word | E-Tag Type (0x893f, 16 bits) | | |
| 2nd word | E-PCP (3 bits) | DEI | Ingress_E-CID_base (12 bits) |
| 3rd word | Rsv1 Rsv2 GRP (2 bits) | | E-CID_Base (12 bits) |
| 4th word | Ingress_E-CID_ext (8 bits) | | E-CID_ext (8 bits) — 525 |

530 — | Rsv (4 bits) | AD-ID (4 bits) |

(56) References Cited

U.S. PATENT DOCUMENTS

2017/0063668 A1\* 3/2017 Sivasankar ............. H04L 45/18
2017/0104665 A1\* 4/2017 Gowthaman ........... H04L 45/02

OTHER PUBLICATIONS

Wikipedia, "Campus network," https://en.wikipedia.org/wiki/Campus_network, Jan. 27, 2016, 2 pages.

\* cited by examiner

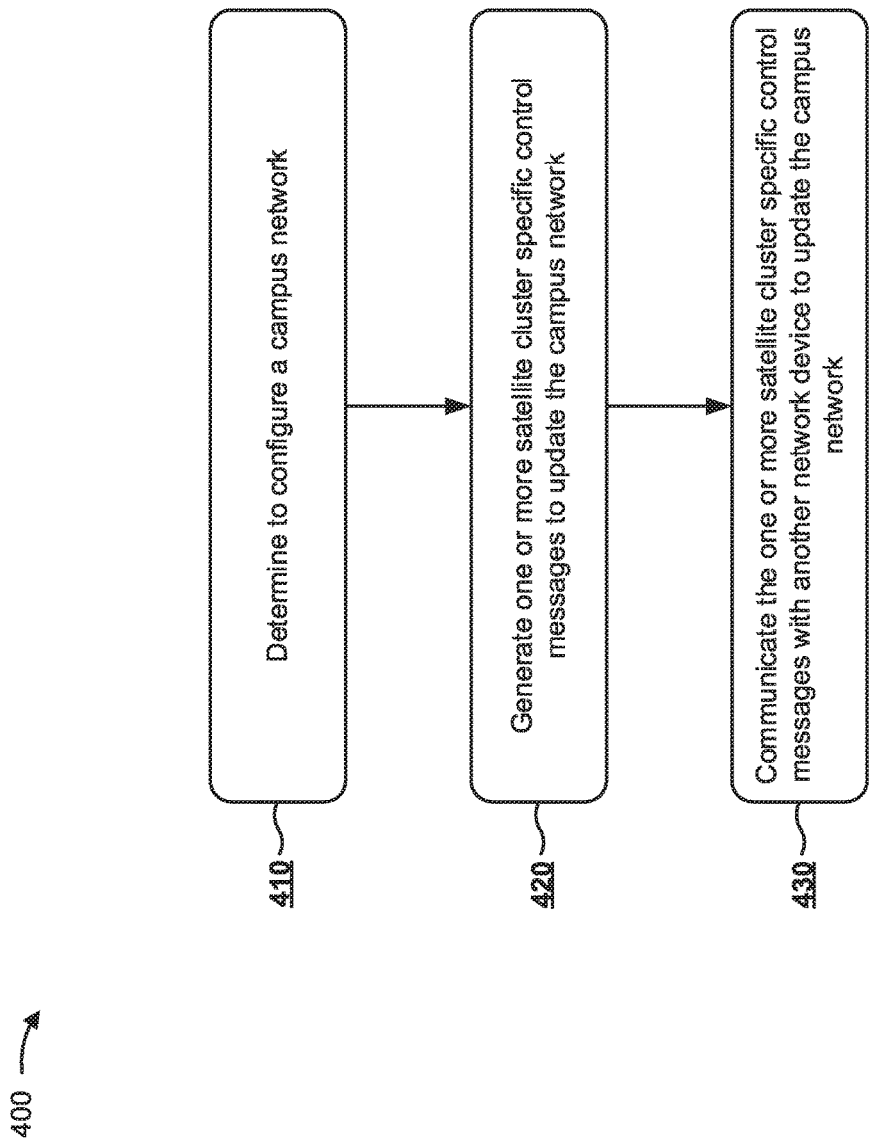

E-CHANNEL IDENTIFIERS (ECIDS) FOR SCALABLE SATELLITE DEVICE CLUSTERING CONTROL IN A CAMPUS NETWORK

BACKGROUND

A campus network, a campus area network, or a corporate area network may refer to an interconnection of local area networks (LANs) within a particular geographical area. Network devices (e.g., switches, routers, or the like) and network connections (e.g., optical fiber) may be owned and/or operated by the campus tenant, the owner, or a service provider (e.g., an enterprise, a university, a government, or the like). The campus network may be utilized to provide routing of network traffic for the particular geographical area, such as for a university campus, a corporate campus, a residential campus, or the like.

Satellite device clustering may include a set of connections that group multiple satellite devices into a single cluster, which is then connected to an aggregation device as a single group instead of as individual satellite devices. Satellite device clustering is particularly useful in scenarios where optical cabling options between buildings are limited and when optical interfaces should be preserved. For example, satellite device clustering may be utilized to provide routing of network traffic for campus networks.

SUMMARY

According to some possible implementations, a device may include one or more processors. The one or more processors may receive network traffic for transmission in a campus network. The campus network may include a set of aggregation devices and a set of satellite devices. The set of satellite devices may be grouped into a set of satellite clusters of the campus network. The one or more processors may generate a packet header for the network traffic. The packet header may include an E-channel identifier (ECID) with a quantity of N bits (N>10) reserved to address a packet to a particular satellite device of the set of satellite devices and to a particular port of a set of ports of the particular satellite device. The one or more processors may transmit the network traffic using the packet header based on generating the packet header.

According to some possible implementations, a non-transitory computer-readable medium may store one or more instructions that, when executed by one or more processors of a device, cause the one or more processors to receive network traffic for transmission in a campus network. The campus network may include a set of aggregation devices and a set of satellite devices. The set of satellite devices may be grouped into a set of satellite clusters of the campus network. The one or more instructions, when executed by one or more processors of a device, cause the one or more processors to generate a packet header for the network traffic. The packet header may include an E-channel identifier (ECID) with 12 bits reserved for a member identifier to address a packet to a particular satellite device of the set of satellite devices and for a port identifier to address the packet to a particular port of a set of ports of the particular satellite device. The one or more instructions, when executed by one or more processors of a device, cause the one or more processors to transmit the network traffic using the packet header based on generating the packet header.

According to some possible implementations, a system may include a set of aggregation devices to provide a control plane for a campus network and to route network traffic. The system may include a set of satellite devices to provide a set of ports for the set of aggregation devices to route the network traffic. The set of satellite devices may be grouped into a set of satellite clusters. A packet, of the network traffic, may include a packet header with an E-channel identifier (ECID). The ECID may include 12 bits reserved for a member identifier to address the packet to a particular satellite device of the set of satellite devices and for a port identifier to address the packet to a particular port of a set of ports of the particular satellite device.

BRIEF DESCRIPTION OF THE DRAWINGS

FIG. 4 is a flow chart of an example process for controlling a campus network with satellite clusters.

DETAILED DESCRIPTION

The following detailed description of example implementations refers to the accompanying drawings. The same reference numbers in different drawings may identify the same or similar elements.

Campus networks may include an aggregation device and a set of satellite devices to perform routing of network traffic. The satellite devices may be organized into satellite clusters. For example, a set of aggregation devices may be connected to multiple satellite clusters of satellite devices to route network traffic for a university campus, a corporate campus, or another environment. However, management of the clusters of satellite devices, addition or removal of satellite devices from a cluster of satellite devices, and scaling of the campus network to increasing quantities of satellite devices may be infeasible using network control protocols.

Implementations, described herein, may utilize a set of satellite cluster specific control messages (SCSCMs) to provide plug-and-play addition and/or removal of satellite devices to satellite clusters, and to provide single point management for a campus network including satellite clusters (e.g., managing routing, updating, or the like for satellite devices from a single aggregation device), and may permit scaling of campus networks to increasing quantities of satellite devices. For example, implementations described herein may use configurable portions of control protocol messages and/or reconfigurable message formats to facilitate satellite clustering for campus networks. In this way, network performance is improved relative to utilizing satellite clustering with existing control protocols. In particular, the likelihood of errors resulting from excessive quantities of satellite devices may be reduced. Additionally, or alternatively, throughput is improved based on permitting the campus network to scale to increased quantities of satellite devices.

Figure 1:
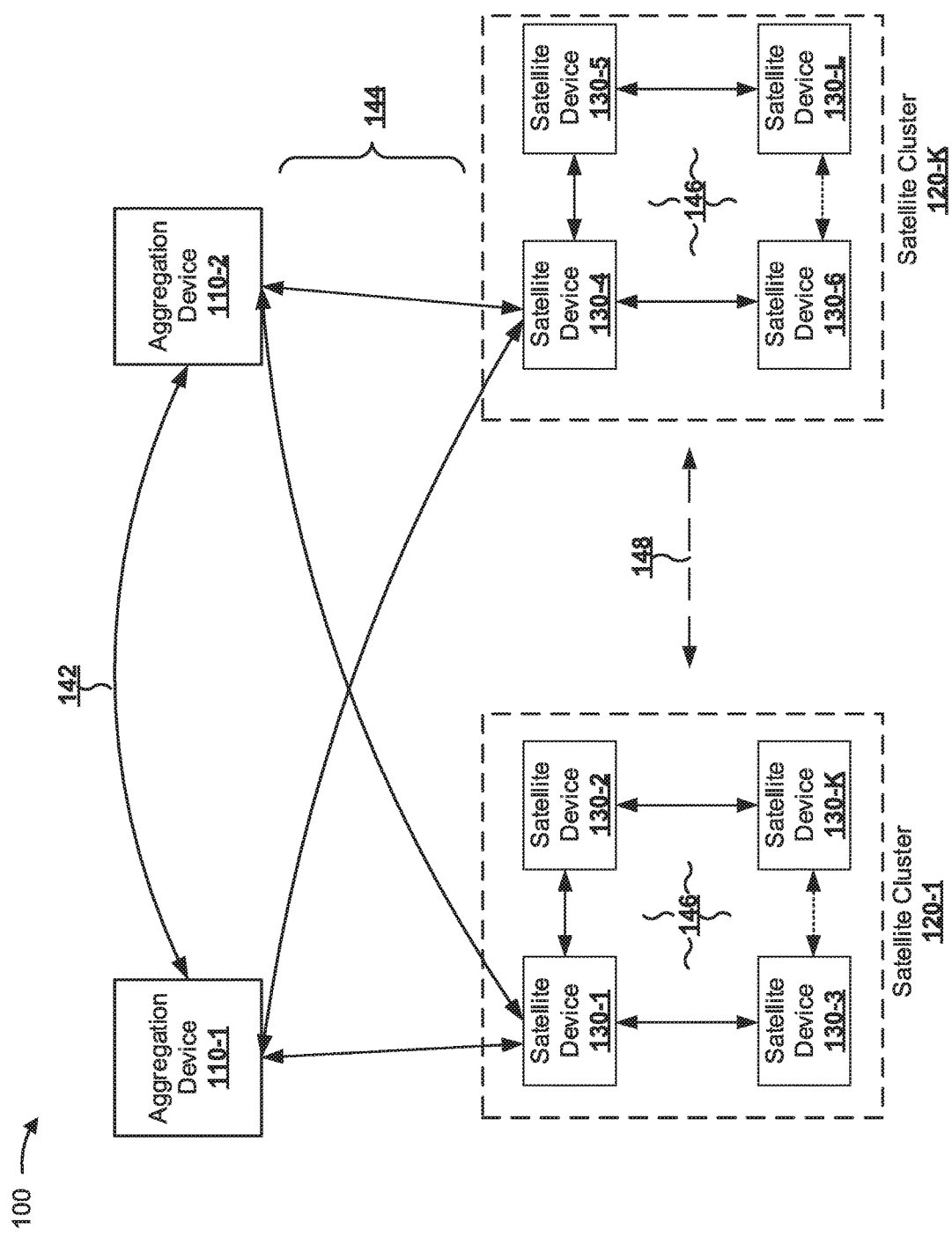
FIG. 1 is a diagram of an overview of an example implementation described herein.

FIG. 1 is a diagram of an overview of an example implementation 100 described herein. FIG. 1 illustrates a control plane of an example network (e.g., a campus network) including aggregation devices 110-1 and 110-2 and satellite clusters 120-1 through 120-K. Each satellite cluster 120 may include one or more satellite devices 130. A satellite device 130 within a satellite cluster 120 may directly connect to one or more aggregation devices 110. For example, each satellite cluster 120 may include a border satellite device 130 (e.g., satellite device 130-1 or satellite device 130-4) that is connected to one or more aggregation devices 110. One or more other satellite devices 130 within a satellite cluster 120 may connect to one or more aggregation devices 110 via a border satellite device 130. For example, each satellite cluster 120 may include a set of non-border satellite devices 130 (e.g., satellite devices 130-2 through 130-K or satellite devices 130-5 through 130-L), which may connect to the one or more aggregation devices 110 via a border satellite device 130.

As further shown in FIG. 1, and by reference number 142, multiple aggregation devices 110 may communicate (e.g., exchange) messages via a first link (e.g., using aggregation device to aggregation device (AD-AD) SCSCMs) of the control plane that is provided by the set of aggregation devices 110 and/or the set of satellite devices 130. In some implementations, aggregation devices 110 may communicate using a control-and-status protocol (CSP) message. For example, aggregation device 110-2 may utilize a CSP message to transmit information to aggregation device 110-1 for distribution to satellite devices 130 connected to aggregation device 110-1 (e.g., satellite devices 130-1 and/or 130-4) and to synchronize configuration information between multiple aggregation devices 110. In this way, the example network may permit a single point of management of multiple clusters of satellite devices 130.

As further shown in FIG. 1, and by reference number 144, aggregation devices 110 may communicate with border satellite devices 130 (e.g., using aggregation device to satellite device (AD-SD or SD-AD) SCSCMs) via a second link of the control plane. For example, aggregation devices 110 and border satellite devices 130 may utilize a link layer discovery protocol (LLDP) message for communication. In some implementations, communications between aggregation device 110 and border satellite device 130 may utilize a configurable portion of an LLDP message to permit aggregation device 110 to auto-discover satellite devices 130. Additionally, or alternatively, aggregation device 110 may utilize the configurable portion of the LLDP message to provide information identifying a satellite cluster 120 to which a particular satellite device 130 is assigned. Additionally, or alternatively, aggregation device 110 may utilize the configurable portion of the LLDP message to provide provisioning information identifying a set of attributes to satellite device 130. In this case, the set of attributes may include address information to permit satellite devices 130 to access an internal Internet Protocol (IP)-based private control-plane network (e.g., associated with a provisioning server) from which satellite devices 130 receive configuration information.

In some implementations, a particular satellite device 130 may utilize a configurable portion of an LLDP message to provide information identifying capabilities of the particular satellite device 130 or another satellite device 130 (e.g., a software version, a quantity of ports, etc.). For example, a satellite device 130 may utilize a set of customizable type length value (TLV) elements of an LLDP message to indicate the capabilities of the satellite device 130, and aggregation device 110 may be configured to parse the set of customizable TLV elements to identify the capabilities of the satellite device 130 based on receiving the LLDP message.

In some implementations, an aggregation device 110 and a border satellite device 130 may utilize a configurable portion of a CSP message for communication. For example, aggregation device 110 may utilize a configurable portion of a CSP message to include provisioning information, such as a slot identifier (e.g., that identifies a slot of a flexible physical interface card (PCI) concentrator (FPC)), a member identifier (e.g., identifying a satellite device 130), a cluster identifier (e.g., identifying a satellite cluster 120), a loopback address, an IP address space, or the like, and border satellite device 130 may be configured to determine the provisioning information based on parsing the configurable portion of the CSP message. In this case, border satellite device 130 may utilize the provisioning information and/or distribute the provisioning information for utilization by other non-border satellite devices 130 to route network traffic.

In some implementations, border satellite device 130 may include reachability information in a configurable portion of a CSP message. For example, border satellite device 130 may include information identifying a shortest path from aggregation device 110 to each satellite device 130 of a satellite cluster 120, and aggregation device 110 may be configured to parse the CSP message to determine the reachability information. In this case, aggregation device 110 may utilize the reachability information to route network traffic to and/or via satellite devices 130.

As further shown in FIG. 1, and by reference numbers 146, satellite devices 130 may communicate with other satellite devices 130 of the same satellite cluster 120 (e.g., using satellite device to satellite device (SD-SD) SCSCMs) via a third link of the control plane. In some implementations, satellite devices 130 may utilize a configurable portion of intermediate system to intermediate system protocol (IS-IS) messages within a particular satellite cluster 120 (e.g., for topology discovery of a shortest path between aggregation device 110 and a particular satellite device 130). In some implementations, a particular satellite device 130 may utilize the configurable portion of an IS-IS message to provide provisioning information via an IP-based private control-plane network to other satellite devices 130, and the other satellite devices 130 may be configured to parse the configurable portion of the IS-IS message to determine the provisioning information. In this way, satellite devices 130 may permit bootstrapping of additional satellite devices 130 into (addition) or out of (removal) a satellite cluster 120 by permitting a border satellite device 130 to store provisioning information and distribute the provisioning information within satellite cluster 120 and without aggregation device 110 being required to directly communicate with each satellite device 130 of satellite cluster 120. In some implementations, each satellite cluster 120 may utilize a separate instance of IS-IS, and aggregation devices 110 may not utilize the instances of IS-IS. For example, a border satellite device 130 of each satellite cluster 120 may establish an IS-IS instance for satellite devices 130 of the satellite clusters 120 to perform topology discovery and determine a shortest path for routing of network traffic to stacking ports of the satellite devices 130. In this case, aggregation devices 110 may not receive messages associated with topology discovery (e.g., via an IS-IS instance, but may receive a message from a border satellite device 130 after topology discovery is complete) to avoid overloading aggregation devices 110 with topology discovery messages when multiple satellite clusters 120 are undergoing topology changes (e.g., adding a satellite device 130, removing a satellite device 130, etc.). In this way, a campus network may include an increased quantity of satellite devices 130, relative to another configuration of a campus network, without overloading aggregation devices 110 with topology discovery messages.

As further shown in FIG. 1, and by reference number 148, satellite devices 130 of different satellite clusters 120 may communicate with each other (e.g., via aggregation devices 110, via direct messaging, or the like) via a fourth link of the control plane. In another example, satellite devices 130 and/or aggregation devices 110 may utilize other configurable portions of a message to provide information to permit satellite clustering, as described herein. For example, satellite devices 130 and/or aggregation devices 110 may utilize a configurable E-channel identifier (E-CID or ECID) format for header information of packets to permit the packets to be routed to satellite clusters 120 with greater than a threshold quantity of satellite devices 130, as described in more detail with regard to FIGS. 5A and 5B.

The layout of a campus network and the utilization of configurable portions of one or more messages, as described herein, may improve network performance relative to utilizing control protocol messages that are not configured for satellite clustering for communication and control of satellite clusters. In particular, the likelihood of errors resulting from excessive quantities of satellite devices may be reduced relative to utilizing existing protocol messages. Additionally, or alternatively, throughput is improved from the ability to add increased quantities of satellite devices. Moreover, a quantity of satellite devices and/or a quantity of ports of the satellite devices that may be included in a satellite cluster is increased relative to utilizing another ECID format.

As indicated above, FIG. 1 is provided merely as an example. Other examples are possible and may differ from what was described with regard to FIG. 1.

Figure 2:
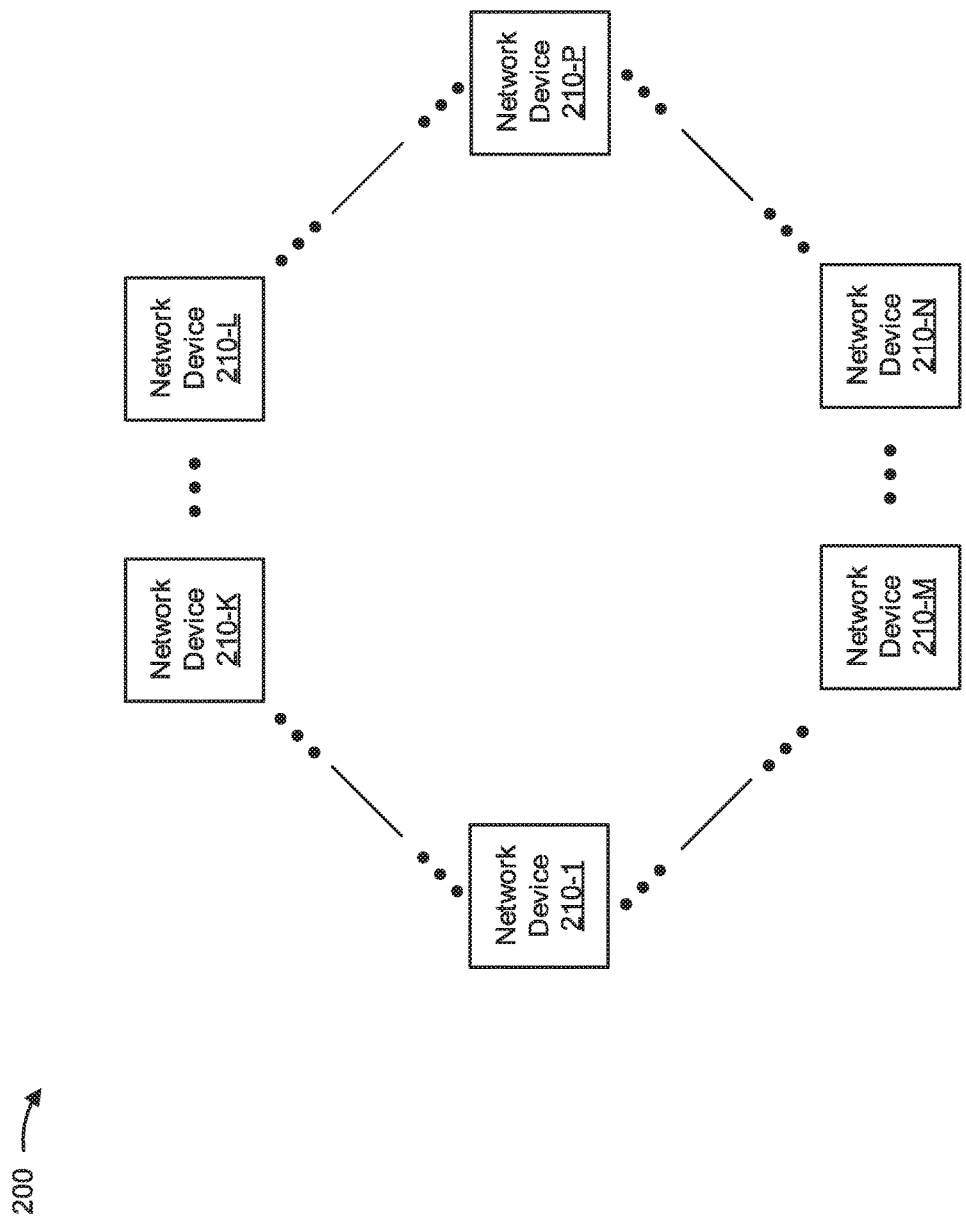
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210") and one or more networks. Devices of environment 200 may interconnect via wired connections, wireless connections, or a combination of wired and wireless connections.

Network device 210 may include one or more devices (e.g., one or more traffic transfer devices) capable of processing and/or transferring traffic between endpoint devices. For example, network device 210 may include a firewall, a router, a gateway, a switch, a hub, a bridge, a reverse proxy, a server (e.g., a proxy server), a top of rack (ToR) switch, a load balancer, a user device, or a similar device. In some implementations, network device 210 may include an aggregation device (e.g., aggregation device 110 shown in FIG. 1) for a satellite cluster of satellite devices. In some implementations, network device 210 may include a satellite device (e.g., satellite device 130 shown in FIG. 1) included in a satellite cluster (e.g., satellite cluster 120 shown in FIG. 1).

In some implementations, different network devices 210 may have different roles in environment 200. For example, some network devices 210 may correspond to aggregation devices (e.g., aggregation devices 110) associated with a campus network, some network devices 210 may correspond to satellite devices (e.g., satellite devices 130) associated with the campus network, and some network devices 210 may correspond to endpoint network devices 210 or other network devices 210 connected to the campus network. The satellite devices may be included in satellite clusters (e.g., satellite clusters 120). The aggregation devices and the satellite devices may communicate in a manner similar to that described with regard to FIG. 1. Thus, while FIG. 2 shows network devices 210 connected to other network devices 210, these network devices 210 may operate to form one or more campus networks.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, a cloud-based computing network, an ad hoc network, an intranet, the Internet, a fiber optic-based network, a campus network, an Ethernet virtual private network (EVPN) virtual extensible LAN (VXLAN) network, another type of EVPN network (e.g., an EVPN—multiprotocol label switching (MPLS) network or the like), a subnet network (e.g., a subnet), and/or a combination of these or other types of networks.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
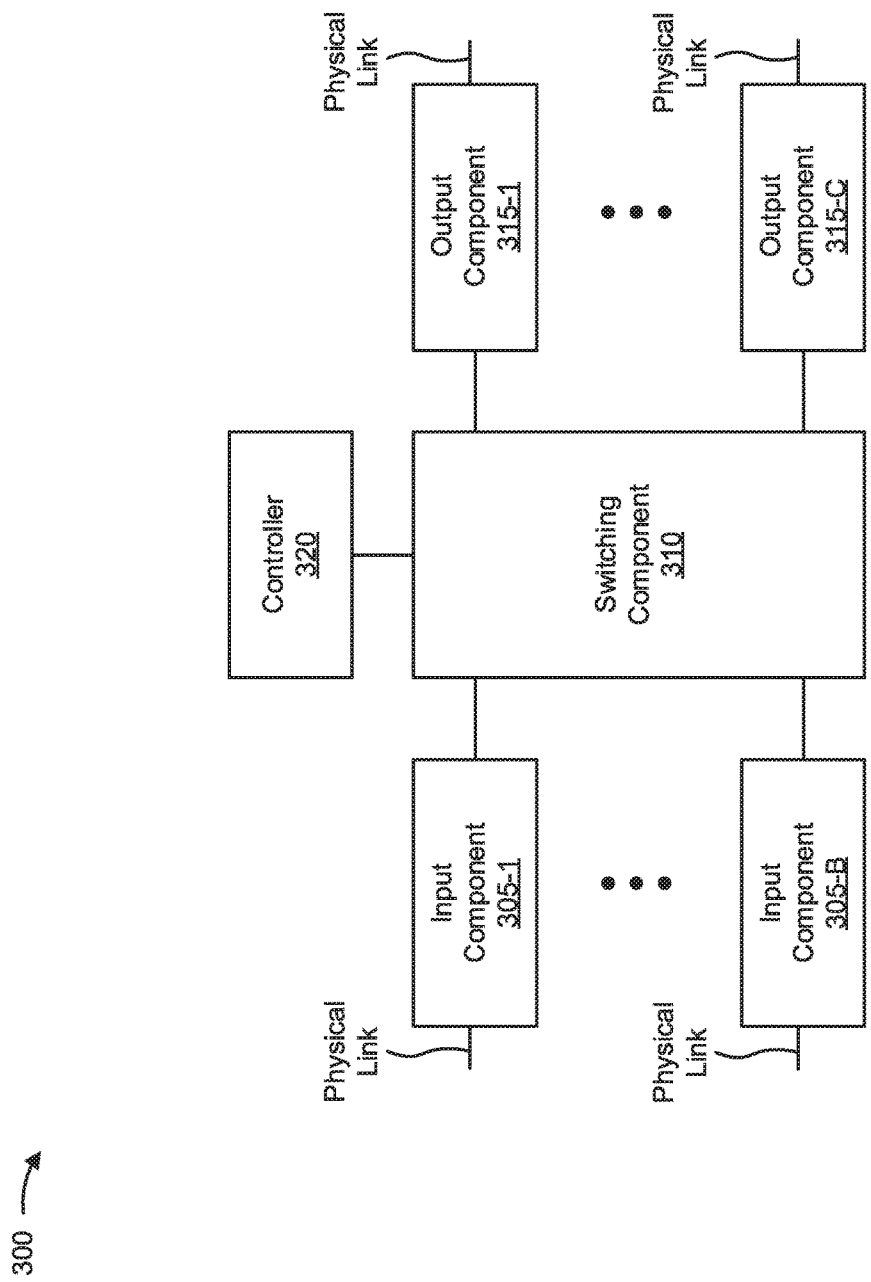
FIG. 3 is a diagram of example components of one or more devices of FIG. 2.

FIG. 3 is a diagram of example components of a device 300. Device 300 may correspond to network device 210 (e.g., an aggregation device 110 or a satellite device 130). In some implementations, network device 210 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320. Components of device 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (i.e., an input/output component may be a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. Controller 320 is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to communicate information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for controlling a campus network with satellite clusters. In some implementations, one or more process blocks of FIG. 4 may be performed by a network device 210. In some implementations, one or more process blocks of FIG. 4 may be performed by another device or a group of devices separate from or including network device 210.

As shown in FIG. 4, process 400 may include determining to configure a campus network (block 410). For example, network device 210 (e.g., an aggregation device 110 or a satellite device 130) may determine to configure the campus network. In some implementations, network device 210 (e.g., an aggregation device) may receive a configuration instruction from a network management device (e.g., a client device used by a network operator). For example, the network operator may input an instruction to the client device and the client device may send the instruction to network device 210. Network device 210 may receive the instruction and use the instruction to determine that it is time to configure the campus network.

In some implementations, network device 210 may determine to configure the campus network based on identifying a change to a status of a campus network. For example, network device 210 may detect an addition of a new detected satellite device to a cluster of satellite devices, an addition of a cluster of satellite devices, and/or an addition of an aggregation device to the campus network. Additionally, or alternatively, network device 210 may detect a new link between network devices 210 of the campus network (e.g., a new link between existing satellite devices, aggregation devices, etc.). Additionally, or alternatively, network device 210 may detect a removal of another network device 210 and/or a link from the campus network.

Additionally, or alternatively, network device 210 may detect a change to a network configuration (e.g., a change to a routing algorithm that is to be used by network devices 210 to route network traffic). Additionally, or alternatively, network device 210 may detect a change to another network device, such as an addition of a port to a satellite device (e.g., an additional port being made available) or a removal of a port from the satellite device (e.g., the port being made unavailable). Additionally, or alternatively, network device 210 may detect a change to software that is to be used by one or more network devices 210 of the campus network, such as a software update that is to be distributed to one or more network devices 210.

In some implementations, network device 210 (e.g., an aggregation device) may detect the change to the status of the campus network based on receiving a message from another network device 210 (e.g., a satellite device). For example, network device 210 may receive an LLDP message from the other network device 210 indicating that the other network device 210 is added to the campus network. In some implementations, network device 210 (e.g., a satellite device) may detect the change to the status of the network based on receiving a message from another network device 210 (e.g., a satellite device or an aggregation device). For example, network device 210 may receive a message from the other network device 210 identifying a new network device 210, identifying one or more capabilities of a new network device 210, identifying one or more new capabilities of an existing network device 210, or the like.

In some implementations, network device 210 may determine to configure the campus network during an initial setup period. For example, when an aggregation device is connected to a satellite cluster of satellite devices, the aggregation device may determine to provision the satellite cluster of satellite devices prior to performing routing of network traffic. Additionally, or alternatively, network device 210 may determine to configure the campus network during operation of the campus network. For example, an aggregation device may determine to alter an ECID format utilized by network devices 210 of the campus network (e.g., aggregation devices and/or satellite devices) to alter a routing scheme that is utilized (e.g., a transfer between AD-SD and SD-AD routing and hop-to-hop routing).

As further shown in FIG. 4, process 400 may include generating one or more satellite cluster specific control messages to update the campus network (block 420). For example, network device 210 (e.g., an aggregation device or a satellite device) may generate one or more satellite cluster specific control messages (SCSCMs) to update the campus network. A SCSCM may refer to a message for which a portion of the message format is altered or a configurable portion of the message is utilized to provide information relating to enabling control of and/or routing in a campus network of satellite clusters. For example, a first network device 210 may utilize SCSCMs that are based on utilizing a configurable portion of an SCP message, an LLDP message, an IS-IS message, or the like to provide control information and/or routing information. In this case, a second network device 210 may be configured to parse the SCP message, the LLDP message, the IS-IS message, or the like to determine the control information and/or the routing information.

In some implementations, network device 210 may generate the one or more SCSCMs based on the change of status to the campus network. For example, network device 210 (e.g., an aggregation device) may generate an AD-AD SCSCM when a link is added between multiple aggregation devices (e.g., when a new aggregation device is added, when an additional link is added to connect multiple aggregation devices, and/or when an existing link is modified). Additionally, or alternatively, network device 210 (e.g., an aggregation device or a satellite device) may generate an AD-SD SCSCM (or SD-AD SCSCM) when a link is added between an aggregation device and a satellite device. Additionally, or alternatively, network device 210 (e.g., a satellite device) may generate an SD-SD SCSCM when a link is added between multiple satellite devices.

Additionally, or alternatively, network device 210 may generate an SCSCM to add or remove a network device 210 from a satellite cluster. For example, when a new satellite device is added to the campus network, the new satellite device may generate and utilize an SD-SD SCSCM to communicate with a border satellite device via an IS-IS protocol message, which may include network topology information. Based on receiving the IS-IS protocol message, the border satellite device may generate and utilize an SD-AD SCSCM to communicate with an aggregation device via an LLDP message. In this case, the aggregation device may generate and utilize another LLDP message including provisioning attributes identifying a provisioning server, information identifying a satellite cluster to which the new satellite device is added, or the like in a configurable potion of the other LLDP message. This may cause the border satellite device to generate and utilize another IS-IS protocol message to other satellite devices of the satellite cluster (e.g., the new satellite device and/or one or more other satellite devices) to identify network topology information, the provisioning attributes, the information identifying the satellite cluster, or the like, which may permit the new satellite device to route network traffic for the campus network.

In some implementations, network device 210 may generate a control message to alter an E-channel identifier (ECID or E-CID) format. An ECID may refer to a portion of a packet header used for including information associated with routing packets, such as routing packets in the campus network. For example, based on a limitation in a quantity of satellite devices and/or ports that can be identified using an existing ECID format (e.g., a limited quantity of bits to identify a satellite device and/or a port of a satellite device), network device 210 may generate an SCSCM message using an LLDP (e.g., for transmitting from an aggregation device to a border satellite device) or IS-IS (e.g., for transmitting from the border satellite device to a non-border satellite device) type of message to indicate a format for the ECID that is to be used. As an example, network device 210 may generate a control message to indicate that each network device 210 is to utilize an ECID with a configurable portion used to identify direction information, as described in more detail herein, to increase a quantity of satellite devices and/or ports that are identifiable via the ECID. In this way, based on generating (and providing) the control message, each network device 210 (e.g., each aggregation device and/or satellite device) can parse and interpret ECIDs of packets routed via the campus network.

In another example, network device 210 may generate a control message to indicate utilization of an ECID for hop-to-hop routing (e.g., rather than ECIDs for SD-to-AD and AD-to-SD routing). The hop-to-hop routing ECID may be utilized to direct IP network traffic to satellite devices and/or aggregation devices that are not directly connected in a campus network. For hop-to-hop routing, the packet may be routed using software (e.g., rather than in hardware using filter rules and member identifiers that identify destination satellite devices for SD-to-AD and AD-to-SD routing). In this way, network device 210 may improve network configurability by permitting increased reliability using hop-to-hop routing when in a network condition where reliability is desired and permitting increased routing speed using SD-to-AD and AD-to-SD routing when in a network condition where routing speed is desired. Moreover, by permitting switching of ECID formats, network performance may be improved by facilitating improved debugging of network traffic routes relative to utilizing a static ECID format.

In some implementations, network device 210 may generate, using a configurable portion of a header of an SCSCM or another type of message, a header to provide information relating to routing an SCSCM or another type of message to a destination network device 210. For example, as described in more detail with regard to FIGS. 5A and 5B, network device 210 may generate an ECID with a particular format selected for a campus network including a satellite cluster to identify a satellite device to which a packet is to be routed. This may permit an increased quantity of satellite devices to be destination network devices 210 for the campus network relative to another network device 210 that does not utilize a configurable portion of an ECID and/or a particular format of ECID.

As further shown in FIG. 4, process 400 may include communicating the one or more satellite cluster specific control messages with another network device to update the campus network (block 430). For example, network device 210 may communicate (e.g., send, transmit, or exchange) the one or more satellite cluster specific control messages with another network device via a control plane of the campus network to update the campus network. In some implementations, a first network device 210 may communicate the one or more messages with one or more second network devices 210, which may transmit similar messages back to the first network device 210. For example, an aggregation device may send an SCSCM providing identification information to a satellite device, and the satellite device may provide reachability information to the aggregation device via a set of SCSCMs.

In some implementations, a first network device 210 may communicate one or more messages with multiple second network devices 210. For example, as part of a bootstrapping procedure, a border satellite device may communicate one or more SCSCMs with an aggregation device, and may communicate one or more other SCSCMs with a non-border satellite device to provision the non-border satellite device to route network traffic for the campus network.

In some implementations, network device 210 may communicate the one or more SCSCMs to route network traffic between a set of endpoint network devices 210. For example, based on provisioning a set of satellite devices, an aggregation device may receive a packet from a first satellite device and route the packet toward a second satellite device, of the set of satellite devices, using reachability information received from the set of satellite devices. In this case, network device 210 may utilize a configurable portion of a packet header (e.g., an ECID with a particular format) to address packets of the network traffic for routing toward the second satellite device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
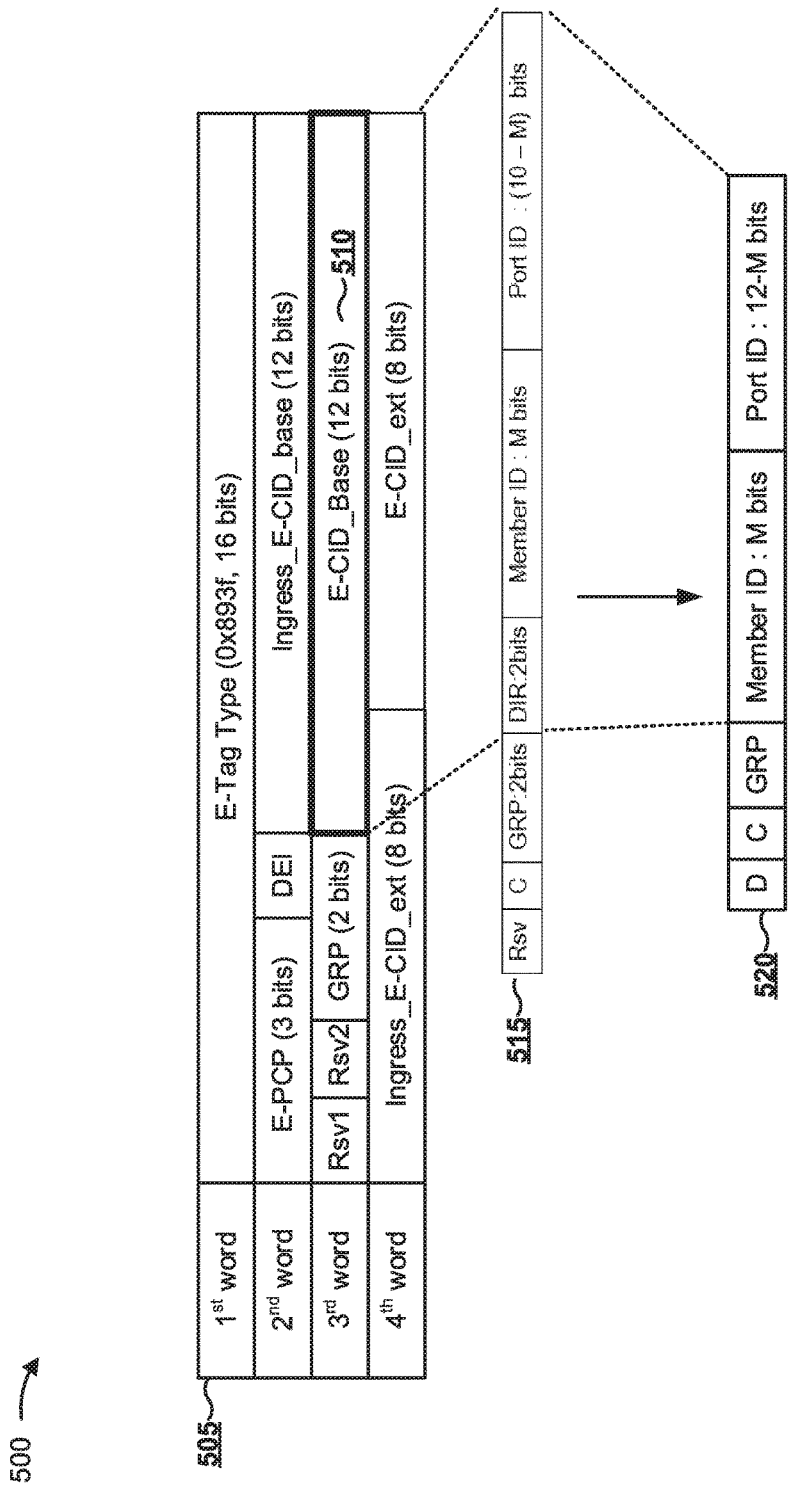
FIGS. 5A and 5B are diagrams of an example implementation relating the example process shown in FIG. 4.
Figure 5B:
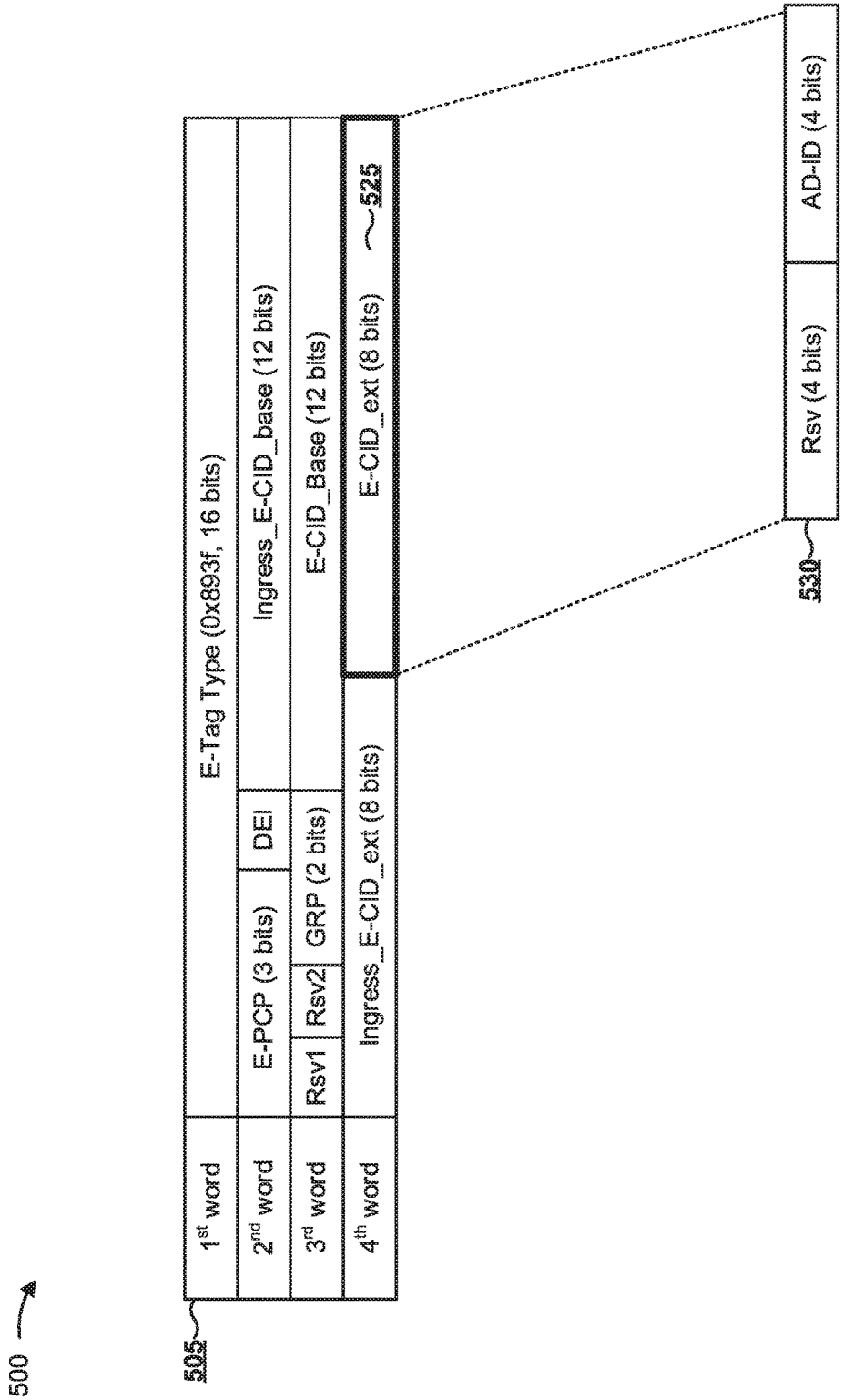

FIGS. 5A and 5B are diagrams of an example implementation 500 relating to example process 400 shown in FIG. 4. FIGS. 5A and 5B show an example of ECID formats for controlling a campus network.

As shown in FIG. 5A, network device 210 may utilize an example E-channel Identifier (ECID or E-CID) format for a header of a message transmitted by and/or received by network device 210. For example, network device 210 may utilize an 802.1BR packet header format. Based on a quantity of bits allocated for identifying a satellite device and/or a port of a satellite device, header 505 may permit support of 15 members (e.g., satellite devices of a satellite cluster) with 64 ports per satellite device or 31 members with 32 ports per satellite device. Header 505 may include a 12 bit portion E-CID_base in a second word of header 505. Header 505 may include another 12 bit portion E-CID_Base in a 3$^{rd}$ word of header 505. E-CID_base and E-CID_Base may be utilized to identify routing of a network packet. For example, E-CID_base and E-CID_Base may identify source and/or destination network devices 210 for the network packet.

As further shown in FIG. 5A, and by reference number 515, the E-CID_Base portion of the header is associated with a particular format, including an Rsv portion, a C portion, a GRP portion, a DIR portion, a Member ID portion, and a Port ID portion.

The Rsv portion may include a reserved one bit portion.

The C portion may include a one bit indicator that, when set, indicates that traffic originates from an inter-chassis link (ICL link). The C portion is valid only for network traffic being directed from an aggregation device to a satellite device.

The GRP portion may include a two bit field associated with indicating whether packets are to be unicast or multicast.

The DIR portion may include a two bit field that specifies direction information regarding how a packet is to be forwarded to a neighboring network device 210. The direction information (e.g., the DIR portion) may identify the direction in which a satellite device is to forward traffic. For example, bits 0,0 may represent that the packet is to be sent to an aggregation device. In this case, when multiple aggregation devices are utilized for the campus network, bits 0,0 may indicate that the packet could be sent to the any of the aggregation devices. Bits 0,1 may indicate that the packet is to be sent to a first aggregation device of a set of aggregation devices. In this case, aggregation devices may be ordered based on an identifier of the aggregation devices. Bits 1,0 may indicate that the packet is to be sent to a second aggregation device of the set of aggregation devices. Bits 1,1 may indicate that the packet is to be sent from an aggregation device to a satellite device.

The Member ID portion may include, for example, four or five bits (e.g., M bits) that identify a member identifier of a satellite device within a satellite network device stack.

The Port ID portion may include, for example, 10-M bits (e.g., five to six bits) that identify a port identifier of an extended port of a particular satellite device associated with the identified member identifier. Accordingly, if the member identifier uses five bits, each satellite device may have 32 ports identified by the five bits reserved for the port identifier. In some implementations, the member identifier 0 is a reserved identifier and not used to address any particular satellite device. As a result, 31 satellite devices may be identified using the member identifier (rather than 32). Similarly, if the member identifier uses four bits, each satellite device may have 64 ports identified by the six bits reserved for the port identifier, however only 15 satellite devices may be identified by the four bits reserved for the port identifier with the member identifier 0 being a reserved identifier. The Port ID may identify an extended port within a satellite device.

As further shown in FIG. 5A, and by reference number 520, another format may be utilized for the ECID, which includes a different format for the E-CID_Base field that permits a quantity, N, bits to be reserved for the member identifier and the port identifier. In this case, the quantity, N, may be equal to 12 bits (rather than the 10 bits that are reserved in E-CID-Base field 515). For example, based on network device 210 transmitting an SCSCM to another network device 210, the network devices 210 may utilize E-CID_Base 520, thereby increasing a quantity of satellite devices and/or extended ports that may be included in a satellite cluster relative to using E-CID_Base field 515. The modified format may include a set of portions, such as a D portion, a C portion, a GRP portion, a Member-ID portion, and a Port-ID portion.

The D portion may include a one bit field that, when set, indicates that a packet is sent from an aggregation device to a satellite device. This may be utilized for looping detection (e.g., of network loops that can result in packets being passed between the same aggregation device and satellite device repeatedly), which may occur based on a topology change to a campus network. In this case, based on the D bit and the member identifier, a network device 210 may determine to discard a packet or forward the packet to avoid a loopback related error.

The C portion may include a one bit field that, when set, indicates that traffic is from an ICL link.

The GRP portion may include a two bit field relating to indicating whether the packet is to be unicast or multi-cast.

The Member-ID and Port-ID are associated with 12 bits (e.g., M bits for the Member-ID portion and 12-M bits for the Port-ID portion, where M is 5 bits or 6 bits), thereby (e.g., with M being 6 bits) permitting a satellite device stack that supports up to 63 satellite devices (including the member identifier 0 being reserved) and up to 60 ports per satellite device (including port identifiers 0 to 3 being reserved). Alternatively, using 12 bits (e.g., with M being 5 bits) may permit a satellite device stack that supports up to 31 satellite devices with up to 124 ports per satellite device. In this way, utilization of a satellite cluster specific format for an ECID improves network performance by permitting an increased quantity of satellite devices or ports relative to utilizing another ECID.

As shown in FIG. 5B, and by reference number 525, header 505 may include an E-CID_ext field, which network device 210 (e.g., an aggregation device or a satellite device) may utilize as a configurable portion of the header when generating the header. In this way, network device 210 may include direction information that is not included in E-CID_Base 520 (e.g., based on reducing a size of the DIR field from two bits to one bit and removing the Rsv field in E-CID_Base 520). For example, as shown by reference number 530, a format for the E-CID_ext field may include a set of portions, such as an Rsv portion and an AD-ID portion.

The Rsv portion represents a 4 bit reserved field.

The AD-ID portion represents a 4 bit field to designate an aggregation device, of a set of up to 16 aggregation devices, by including an aggregation device identifier. The designated aggregation device may be a recipient of one or more packets when the D portion indicates that the packets are to be transmitted from a satellite device to an aggregation device. If no aggregation device is designated, any aggregation device may receive the traffic based on load balancing and/or shortest path information. In this way, network device 210 may utilize a configurable portion of a header to direct packets for routing, and to permit scaling of a campus network to an increased quantity of satellite devices and/or ports while still being able to designate a particular aggregation device to receive packets.

In some implementations, network device 210 may alter a header of a packet to utilize the configurable portion of the header. For example, when an aggregation device receives a packet using a header without the configurable portion and is to direct the packet to a satellite device of a satellite cluster, the aggregation device may parse the header of the packet, and may generate a new header for the packet based on parsing the header of the packet to utilize the configurable portion, thereby permitting addressing of a satellite device in a satellite cluster that includes the increased quantity of satellite devices and/or ports.

In another example, the E-CID_ext field may be used for an aggregated interface, such as when an aggregation device is to transmit multi-destination traffic toward a satellite device for replication by the satellite devices. In this case, a reserved member identifier may be utilized to indicate an aggregated interface. In some implementations, an aggregated interface identifier may be included in an ingress ECID field (e.g., Ingress E-CID_base or Ingress_E-CID_ext).

As indicated above, FIGS. 5A and 5B are provided merely as an example. Other examples are possible and may differ from what was described with regard to FIGS. 5A and 5B.

As described herein, campus network performance may be improved relative to another technique that does not utilize SCSCMs or other ECID formats based on the processes and/or descriptions described herein. In particular, the likelihood of errors resulting from excessive quantities of satellite devices may be reduced. Additionally, or alternatively, throughput is improved from the ability to add increased quantities of satellite devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive network traffic for transmission in a campus network,
the campus network including a plurality of aggregation devices and a plurality of satellite devices, and
the plurality of satellite devices being grouped into a plurality of satellite clusters of the campus network;
generate a packet header for the network traffic,
the packet header including an E-channel identifier (ECID) with a quantity of N bits (N>10) reserved to address a packet to a particular satellite device of the plurality of satellite devices and to a particular port of a plurality of ports of the particular satellite device,
a configurable portion of the ECID including 4 bits to identify at least one aggregation device of the plurality of aggregation devices;
transmit the network traffic using the packet header based on generating the packet header.

2. The device of claim 1, where the ECID includes a first quantity of bits, M, reserved for a member identifier identifying the particular satellite device and a second quantity of bits, N–M, reserved for a port identifier identifying the particular port.

3. The device of claim 1, where the one or more processors, when generating the ECID, are to:
generate, in the configurable portion of the packet header, an identifier of an aggregation device that is a destination for the network traffic.

4. The device of claim 1, where one or more identifiers of the ECID are reserved identifiers that do not identify any particular satellite device or any particular port.

5. The device of claim 1, where the ECID includes address space for at least 63 satellite devices and address space for at least 60 ports for each of the at least 63 satellite devices.

6. The device of claim 1, where the ECID includes address space for at least 31 satellite devices and address space for at least 124 ports for each of the at least 31 satellite devices.

7. The device of claim 1, where N=12.

8. The device of claim 1, where the one or more processors, when generating the packet header, are to:
generate an aggregated interface identifier,
the aggregated interface identifier being a member identifier that is reserved from assignment to any satellite device, and
the aggregated interface identifier being included in an ingress ECID.

9. The device of claim 1, where the one or more processors are further to:
identify an addition of a first device to the campus network or a removal of a second device from the campus network; and
determine to configure the campus network based on identifying the addition of the first device or removal of the second device.

10. The device of claim 1, where the one or more processors, when generating the packet header, are to:
generate the ECID to indicate hop-to-hop routing for the network traffic after transmitting a control message to utilize the hop-to-hop routing.

11. A non-transitory computer-readable medium storing instructions, the instructions comprising:
one or more instructions that, when executed by one or more processors of a device, cause the one or more processors to:
receive network traffic for transmission in a campus network,
the campus network including a plurality of aggregation devices and a plurality of satellite devices, and
the plurality of satellite devices being grouped into a plurality of satellite clusters of the campus network;
generate a packet header for the network traffic,
the packet header including an E-channel identifier (ECID) with 12 bits reserved for a member identifier to address a packet to a particular satellite device of the plurality of satellite devices and for a port identifier to address the packet to a particular port of a plurality of ports of the particular satellite device,
a configurable portion of the ECID including 4 bits to identify at least one aggregation device of the plurality of aggregation devices;
transmit the network traffic using the packet header based on generating the packet header.

12. The non-transitory computer-readable medium of claim 11, where the ECID includes a first quantity of bits, M reserved for the member identifier and a second quantity of bits, 12-M, reserved for the port identifier identifying the particular port.

13. The non-transitory computer-readable medium of claim 12, where M is 5 or 6.

14. The non-transitory computer-readable medium of claim 11, where one or more member identifiers of the ECID are reserved identifiers that do not identify any satellite device of the plurality of satellite devices.

15. The non-transitory computer-readable medium of claim 11, where the device includes a satellite device stack that supports greater than 32 satellite devices.

16. The non-transitory computer-readable medium of claim 11, where the device includes a satellite device stack that supports greater than 64 ports per satellite device.

17. The non-transitory computer-readable medium of claim 11, where the packet header is an 802.1BR header with the configurable portion to include an indicator of an aggregation device, of the plurality of aggregation devices, to which the packet is to be routed.

18. A system, comprising:
a set of aggregation devices to provide a control plane for a campus network and to route network traffic; and
a set of satellite devices to provide a set of ports for the set of aggregation devices to route the network traffic,
the set of satellite devices being grouped into a plurality of satellite clusters, and
a packet, of the network traffic, including a packet header with an E-channel identifier (ECID),
the ECID including 12 bits reserved for a member identifier to address the packet to a particular satellite device of the set of satellite devices and for a port identifier to address the packet to a particular port of a set of ports of the particular satellite device, and a configurable portion of the ECID including 4 bits to identify the set of aggregation devices.

19. The system of claim 18, where the set of aggregation devices and the set of satellite devices are to route the network traffic based on the ECID.

20. The system of claim 18, where:

the ECID includes data indicating hop-to-hop networking for the network traffic.

* * * * *